United States Patent [19]
Wallace

[11] Patent Number: 5,964,024
[45] Date of Patent: Oct. 12, 1999

[54] ROLL CUTTER

[75] Inventor: Marcus T. Wallace, Smyrna, Tenn.

[73] Assignee: Norkol/Fibercore, Inc., Ill.

[21] Appl. No.: 08/896,504

[22] Filed: Jun. 25, 1997

[51] Int. Cl.[6] ............................... B23P 23/00; B26D 3/16
[52] U.S. Cl. ................................. 29/558; 82/47; 82/122; 83/56; 83/924
[58] Field of Search ................................. 29/27 R, 27 C; 82/101, 122, 47; 83/801, 466.1, 924, 516, 54, 56

[56] References Cited

U.S. PATENT DOCUMENTS

| | | | |
|---|---|---|---|
| 734,444 | 7/1903 | Stenger | 83/614 |
| 1,151,527 | 8/1915 | Lewis . | |
| 1,350,840 | 8/1920 | Robbins | 82/122 X |
| 1,485,383 | 3/1924 | Fowl et al. | 82/122 |
| 2,227,789 | 1/1941 | MacFarren | 144/96 |
| 2,738,841 | 3/1956 | Jones | 144/43 |
| 3,090,173 | 5/1963 | Strickland et al. | 82/122 |
| 3,174,369 | 3/1965 | Denk et al. | 82/101 |
| 3,522,748 | 8/1970 | Treffner | 32/101 |
| 3,661,043 | 5/1972 | Voigt | 82/101 |
| 3,938,671 | 2/1976 | Lewey et al. | 214/1 R |
| 3,995,747 | 12/1976 | Lewey et al. | 214/1 P |
| 4,175,454 | 11/1979 | Goldstein | 82/101 X |
| 4,217,799 | 8/1980 | Faris | 82/122 X |
| 4,292,867 | 10/1981 | Stoffels | 82/47 |
| 4,534,151 | 8/1985 | Schneck et al. | 82/101 X |
| 4,579,025 | 4/1986 | Fasolak | 83/801 X |
| 5,016,429 | 5/1991 | Kubsik | 83/425.4 |
| 5,038,647 | 8/1991 | Biagiotti | 83/466.1 X |
| 5,060,456 | 10/1991 | Wehrli | 82/101 X |
| 5,542,623 | 8/1996 | Garand et al. | 242/559 |

*Primary Examiner*—William Briggs
*Attorney, Agent, or Firm*—Waddey & Patterson; Lucian Wayne Beavers

[57] ABSTRACT

The present invention discloses a roll cutter. The roll cutter has a housing. To the housing, there is attached a base, a cutter assembly, and an optional hoist assembly. The hoist assembly is a telescoping tower that allows the user to engage a roll using a hoist. The hoist can then pick up the roll and move it onto the stand. Once on the stand, the cutting assembly having a cutting tower, a cutting arm, and a saw can be placed at the desired level of cut. A saw can then be used to cut away the roll until it is the desired width. A sanding blade can be used to sand the edge of the roll.

9 Claims, 5 Drawing Sheets

ROLL CUTTER

BACKGROUND OF THE INVENTION

The present invention relates generally to a paper roll machine and more particularly to a device for cutting a paper roll.

It will be appreciated by those skilled in the art that paper rolls tend to be very large, heavy, and bulky. These rolls, such as paper rolls, are not very easy to maneuver and to handle. It will further be appreciated by those skilled in the art that often times, these paper rolls may obtain damage at the end. Other times, rolls, such as paper rolls, may be too wide to be fed into a press to create the desired size and product. For example, the user may wish to have a 32" wide sheet when the only roll available is 36". As a result, at the end of many runs, paper is wasted that can not otherwise be used.

Presently, the only known method of cutting paper is to lug the paper roll onto a band saw and let the band saw slowly work its way through the paper. Unfortunately, this causes the roll to be placed on its side for a long period of time thereby possibly warping the roll out of circle.

What is needed, then, is a system for cutting rolls of materials such as paper. This needed device must be capable of cutting rolls very efficiently and easily. This device must be capable of easily handling the bulky and heavy paper roll. This device must be capable of converting wide rolls into narrower rolls. This needed device must also be capable of sanding the edge of a roll. This device is presently lacking in the prior art.

SUMMARY OF THE INVENTION

The present invention discloses a roll cutter. The roll cutter has a housing. To the housing, there is attached a base, a cutter assembly, and, possibly, a hoist assembly. The optional hoist assembly is a telescoping tower that allows the user to engage a roll using a hoist. The hoist can then pick up the roll and move it onto the stand. Otherwise, the roll may be put in place using external moving devices such as fork lifts. Once on the stand, the cutting assembly having a cutting tower, a cutting arm, and a saw can be placed at the desired level of cut. A saw can then be used to cut away the roll until it is the desired width. The saw blade can have a sanding face, or a sanding wheel can replace the saw blade to sand the surface of the roll.

What is needed, then, is a system for cutting a roll such as paper.

Another object of the present invention is to provide a cutter that has a stand which can easily receive the roll.

Another object of the present invention is to provide a system for moving the roll and handling the roll.

Another object of the present invention is to provide a device which can be adjusted to cut the roll to the desired width.

Another object of the present invention is to provide a system which is economical, easy to use, and easy to manufacture.

Another object of the present invention is to provide a system for sanding the edge of a roll.

DESCRIPTION OF THE PREFERRED EMBODIMENT

Figure 1:
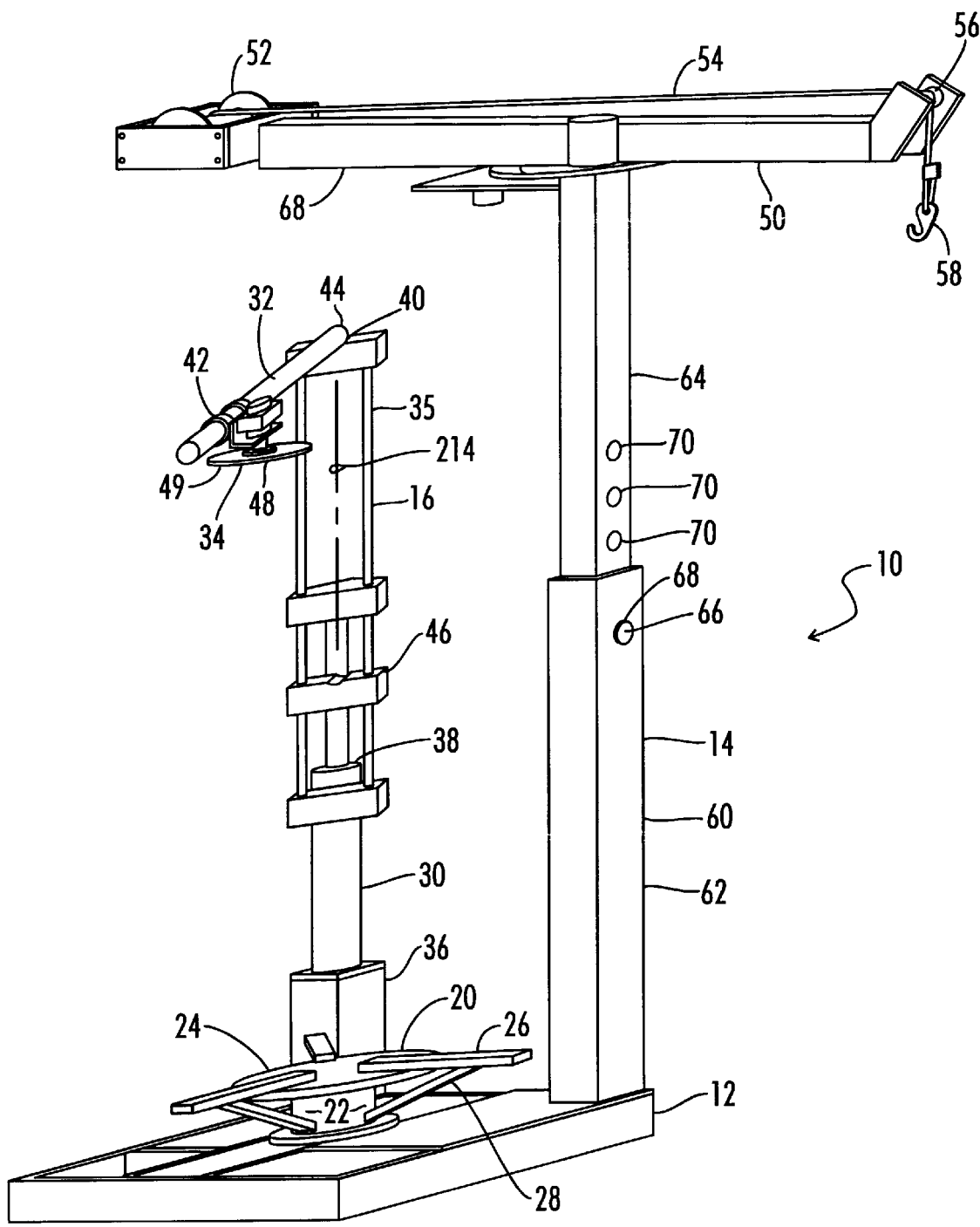
FIG. 1 is a perspective view of the roll cutter of the present invention.

Referring now to FIG. 1, there is shown generally at 10 the roll cutter of the present invention. Roller cutter 10 has housing 12 which is preferably mounted to or placed on ground (not shown). Roll (100 in later Figures) is received by stand 20 which is attached to housing 12. Stand 20 has pier 22 which attaches to housing 12. On top of pier 22, there is placed base 24. Preferably extending from base 24 there are arms 26 which are supported by joist 28. In the preferred embodiment, pier 22 can rotate with respect to housing 12. Preferably, stand 20 lies proximate middle section of housing 12.

Still referring to FIG. 1, in order to move roll (100 in later drawings), there is provided optional hoist assembly 14. Hoist assembly 14 has hoist tower 60 preferably attached to housing 12. Hoist tower 60 preferably consists of lower section 62 and upper section 64 which preferably telescopes with respect to one another. Preferably, upper section 64 is raised with respect to lower section 62 and held in place by pin 60 placed in hole 68 in lower section 62 and orifice 70 in upper section 64. Multiple orifices 70 are provided for adjustment purposes. Proximal upper end of upper section 64 there is placed hoist 50 which has winch 52 which controls cable 54. Cable 54 then runs over pulley 56 and raises and lowers hook 58. Cable 54 can be placed around roll (100 in later drawings) or can be placed through core (104 in later drawings). If no hoist assembly 14 is provided, a fork lift or other external mechanism is used to place roll 100.

Still referring to FIG. 1, there is shown generally at 16 the cutting assembly of the present invention. Cutting assembly 16 has lower portion 36 which preferably attaches to housing 12. Preferably, cutter tower 30 raises upper portion 35 with respect to lower portion 36. This movement is performed by cutter tower piston 38. Upper portion 35 preferably has upper saw mount 44 and lower saw mount 46. Cutter arm 32 is releasibly attached at either upper saw mount 44 or lower saw mount 46 using standard means of attachment such as screws, brackets, and the like. Cutter arm 32 uses slide bracket 42 to attach saw 34 to cutter arm 32. Bracket 42 can either be a fixed bracket or it can be a slide bracket. Blade 48 is a standard saw blade. However, in the preferred embodiment, blade 48 is also provided with sanding edge. If conventional saw blade is used for blade 48, a sanding blade can replace the cutting blade for sanding edge 106.

Figure 2:
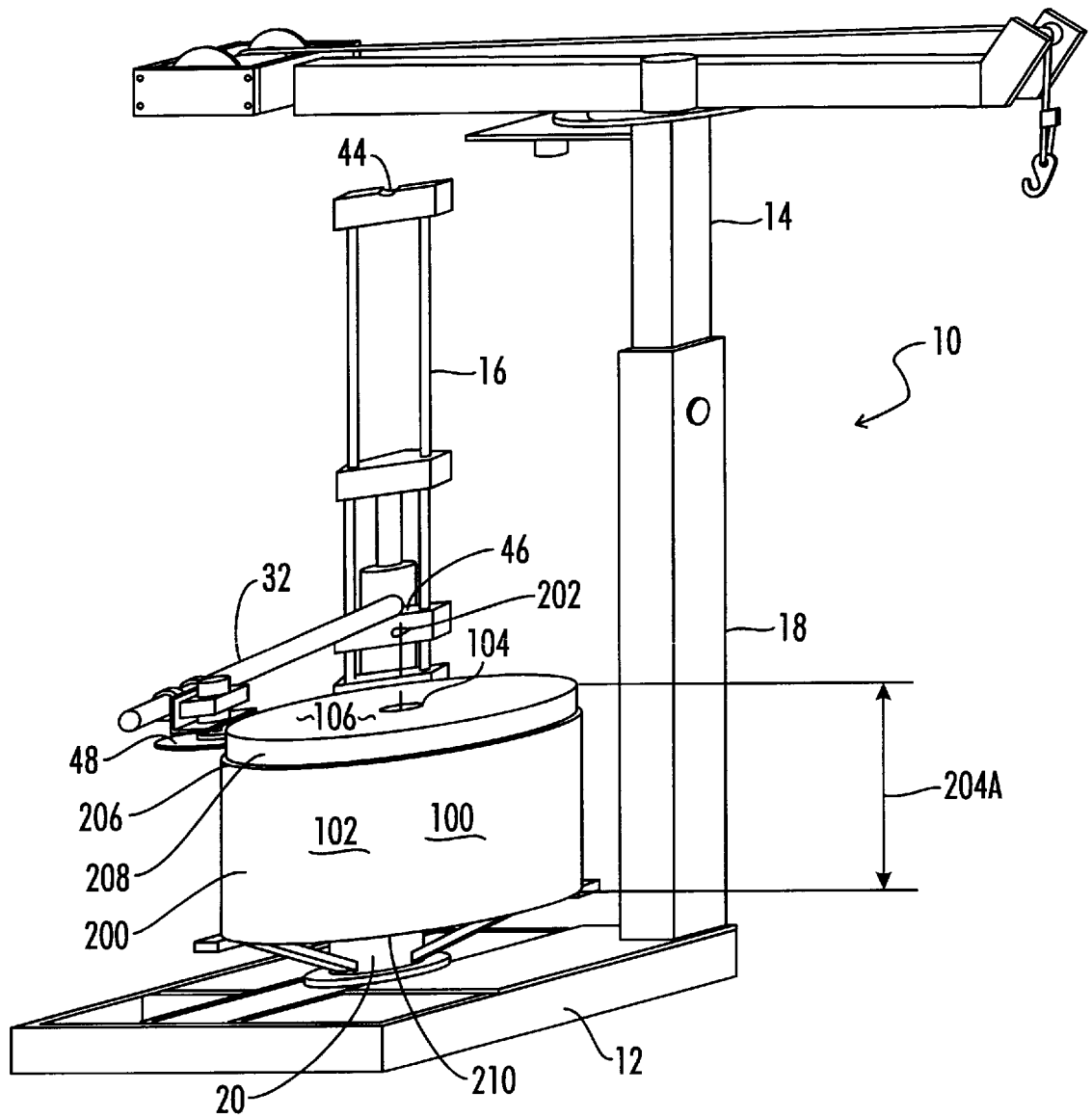
FIG. 2 is a perspective view showing the roll cutter cutting a roll from the lower saw mount.

Referring now to FIG. 2, there is shown generally at 10 the roll cutter of the present invention. In this embodiment, cutter arm 32 is attached to lower saw mount 46 as opposed to upper saw mount 44. This allows device 10 to cut a narrower roll. In this particular embodiment, device 10 is cutting material or paper 102 from roll 100.

Figure 3:
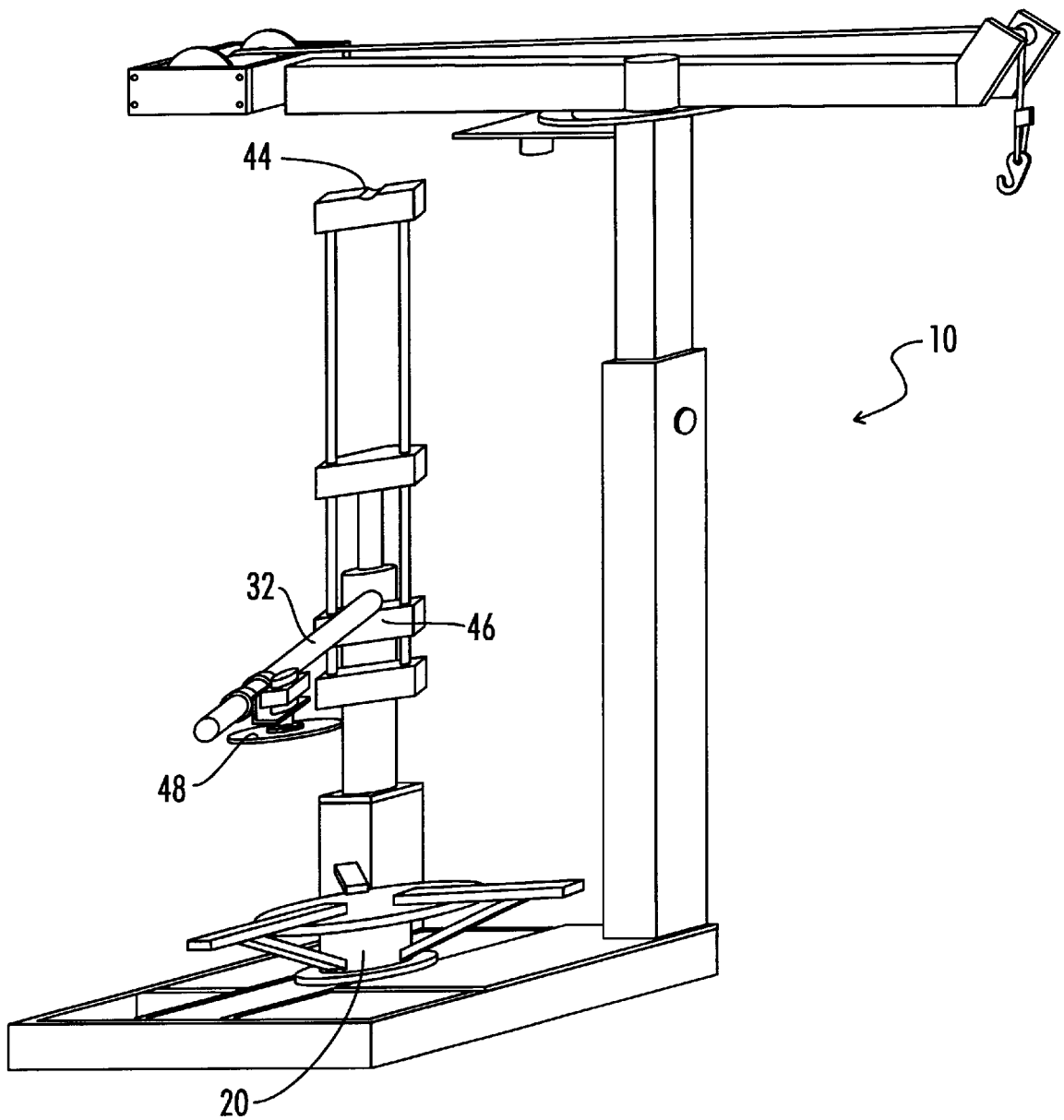
FIG. 3 is a perspective view of the roll cutter of the present invention showing the saw arm mounted to the lower mount.

Referring now to FIG. 3, there is shown generally at 10 the device of the present invention. This figure shows more clearly cutter arm 32 attached to lower saw mount 46 as opposed to upper saw mount 44.

Figure 4:
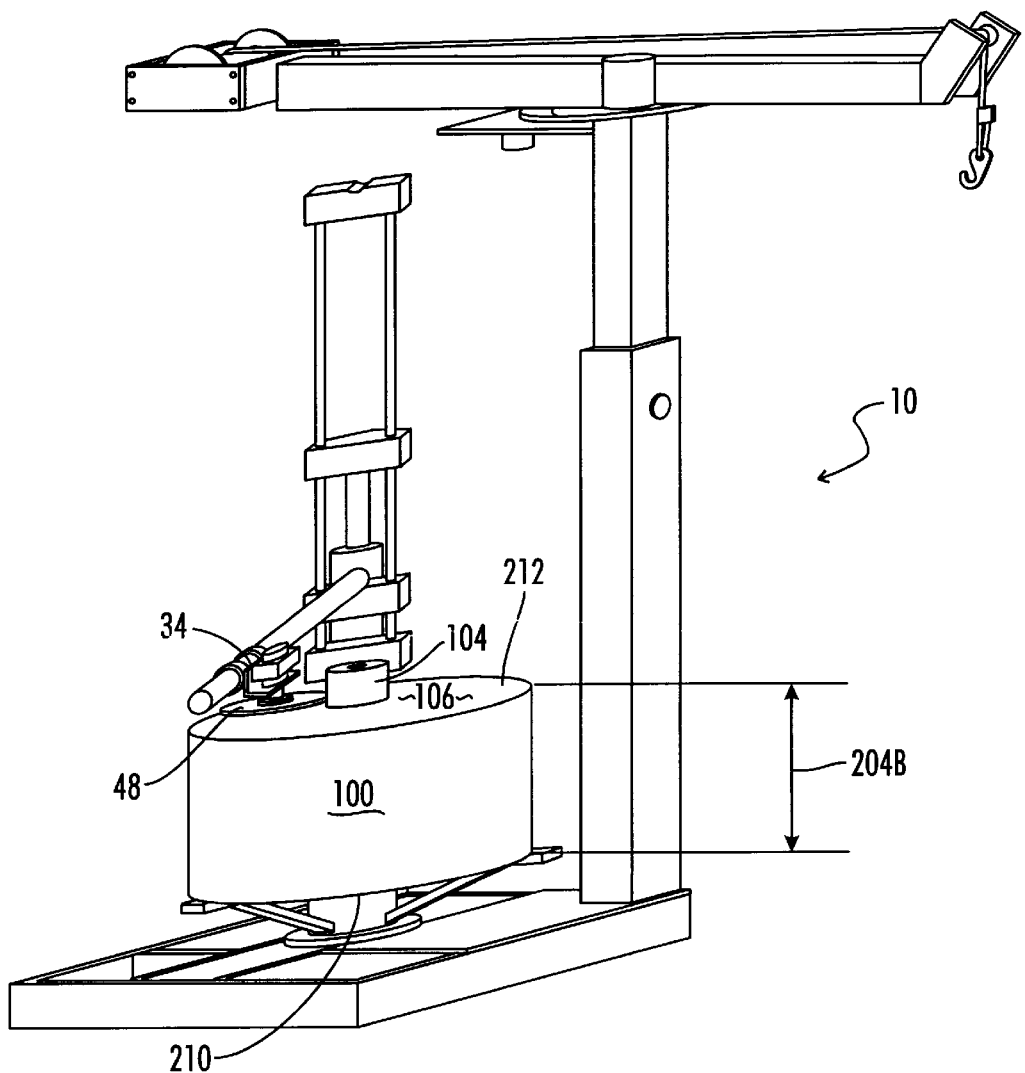
FIG. 4 is a perspective view showing the saw being mounted to the lower mount and cutting the core of the roll.

Referring now to FIG. 4, there is shown generally at 10 the device of the present invention. In this particular embodiment, saw 34 is cutting core 104 of roll 100.

Figure 5:
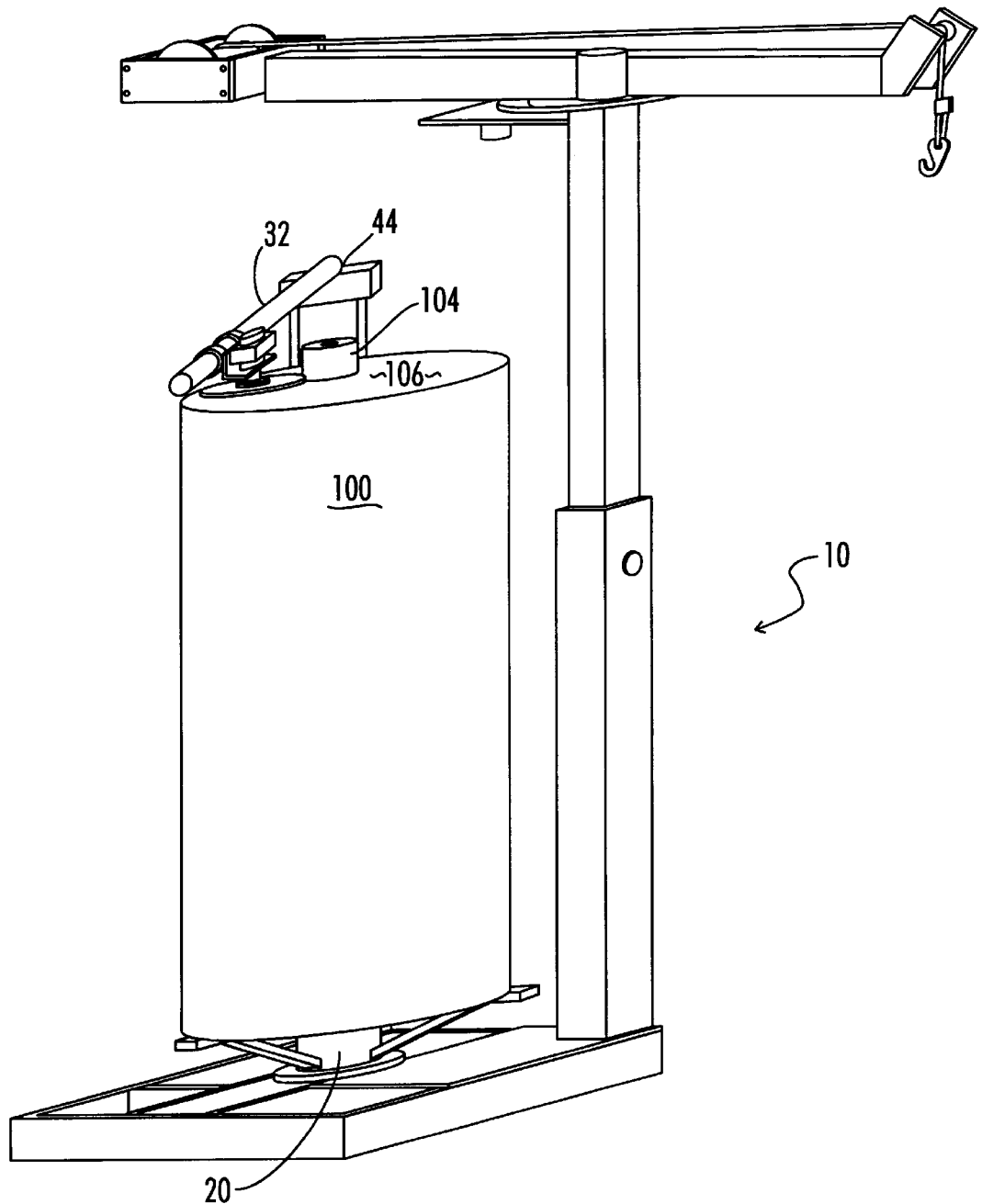
FIG. 5 is a perspective view of the roll cutter of the present invention showing the cutter arm attached to the upper saw mount and cutting the core of a roll.

Referring now to FIG. 5, there is shown generally at 10 still another view of the device of the present invention. In this particular view, cutter arm 32 is attached to upper saw mount 44 and is cutting core 104 of roll 100.

In the preferred embodiment, cutter tower piston 38 is either a hydraulic or pneumatic piston. In the preferred embodiment, saw 34 is a hydraulic or pneumatic rotary saw. In the preferred embodiment, winch 52 is a pneumatic or hydraulic winch such as of the type manufactured by Braiden. In the preferred embodiment, hoist bracket 68 pivots about upper section 64.

METHODS OF OPERATION

The methods of utilizing the apparatus 10 to cut the paper roll 100 may be described as follows.

The paper roll 100 may be described as a cylindrical paper roll having a cylindrical outer surface 200 and having a longitudinal central axis 202 along which an initial width 204A of the paper roll is defined. The methods of the present invention may be described as methods of cutting the paper roll 100 to a narrower width.

The method begins with the step of placing the roll 100 on the rotatable stand 20. The rotatable stand 20 may also be referred to as a turntable 20. The longitudinal central axis 202 of roll 100 extends vertically as seen in FIGS. 2, 4 and 5, when the roll 100 is placed upon the rotatable stand 20.

Then, as seen in FIG. 2, the saw blade 48 is engaged with the outer cylindrical surface 200 of the roll 100. It is noted that the saw blade 48 is oriented horizontally in FIG. 2 and is there shown making a horizontal cut into the roll 100. In FIG. 1, the saw blade 48 has cut partially into the roll 100 thus creating a step 206 in the roll. As is apparent in FIG. 2, the roll 100 has been rotated upon rotatable stand 20 while cutting with the saw blade 48 thus cutting the step 206 around the entire periphery of the roll 100. As is seen in comparing FIGS. 2 and 4, the saw blade 48 continues to cut as the roll 100 rotates thus cutting the entire upper end portion 208 off of the roll 100 thus resulting in a roll as shown in FIG. 4 having a narrower width 204B than did the original roll in FIG. 2.

As described above, the rotary saw blade 48 is mounted upon the cutter arm 32 which extends laterally from the vertical cutter tower 30. The cutter arm 32 pivots relative to the vertical longitudinal axis 214 of tower 30, between the positions shown in FIG. 2 and 4, as the saw blade 48 moves inwardly toward the central longitudinal axis 202 of the paper roll 100 to cut the upper end portion 208 off of the roll 100.

As shown in FIG. 4, and as described above, the saw blade 48 continues its inward motion to cut the core 104 of the paper roll 100.

The method can generally be described as standing the roll 100 on its lower end 210 with its longitudinal axis 202 extending vertically, thereby avoiding warping of the cylindrical shape of the roll, and then cutting off the upper end portion 208 of the roll 100.

While the roll remains standing on its lower end, a newly cut upper end surface 212 (see FIG. 4) is sanded. As previously discussed, this is accomplished by replacing the standard cutting blade 48 with a sander.

Thus, although there have been described particular embodiments of the present invention of a new and useful roll cutter, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A method of cutting a cylindrical paper roll to a narrower width, the cylindrical paper roll having an outer cylindrical surface and having a longitudinal central axis along which the width of the paper roll is defined, said method comprising the steps of:

(a) providing a rotatable stand with a horizontal support surface comprising the primary support for the roll and placing the roll on said rotatable stand with the longitudinal central axis of the roll extending vertically thereby avoiding warping of the cylindrical shape of the roll;

(b) engaging the outer cylindrical surface of the roll with a horizontally oriented rotary saw blade to make a horizontal cut into the roll; and (c) rotating the stand and thereby rotating the roll while sawing the roll with the saw blade thereby cutting an upper end portion off of the roll resulting in a paper roll of narrower width.

2. The method of claim 1, wherein:

in step (b), the horizontally oriented rotary saw blade is mounted upon a cutter arm which extends laterally from a vertical cutter tower; and during step (c), pivoting the cutter arm and the attached saw blade about the cutter tower so that the saw blade moves inwardly toward the longitudinal central axis of the paper roll as the upper end portion is cut off the roll.

3. The method of claim 2, further comprising:

during step (c), cutting a core of the paper roll.

4. A method of cutting an end off of a cylindrical paper roll to provide a roll of narrower width, comprising:

(a) providing a rotatable stand with a horizontal support surface and standing the roll on its lower end upon the horizontal support surface with its longitudinal axis extending vertically, so that the horizontal support surface comprises the primary support for the roll thereby avoiding warping of the cylindrical shape of the roll; and (b) cutting off the upper end of the roll.

5. The method of claim 4, further comprising:

after step (b) and while the roll remains standing on its lower end, sanding the newly cut upper end of the roll.

6. The method of claim 4, wherein:

step (b) includes cutting off an upper end portion of a core of the roll.

7. The method of claim 4, wherein step (b) further comprises:

engaging an outer cylindrical surface of the roll with a saw blade; and advancing the saw blade radially inward from the outer cylindrical surface of the roll toward a core of the roll, while rotating the roll.

8. The method of claim 7 wherein:

the saw blade is a horizontally oriented rotary disc saw blade.

9. The method of claim 7, wherein:

the saw blade is mounted upon a pivotal arm; and the advancing step includes pivoting the pivotal arm toward the core of the roll.

* * * * *